(12) United States Patent
Wang et al.

(10) Patent No.: US 11,481,619 B2
(45) Date of Patent: Oct. 25, 2022

(54) INCORPORATING BLACK-BOX FUNCTIONS IN NEURAL NETWORKS

(71) Applicant: Adobe Inc., San Jose, CA (US)

(72) Inventors: Oliver Wang, Seattle, WA (US); Kevin Wampler, Seattle, WA (US); Kalyan Krishna Sunkavalli, San Jose, CA (US); Elya Shechtman, Seattle, WA (US); Siddhant Jain, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 732 days.

(21) Appl. No.: 16/507,675

(22) Filed: Jul. 10, 2019

(65) Prior Publication Data

US 2021/0012189 A1    Jan. 14, 2021

(51) Int. Cl.
*G06F 17/13* (2006.01)
*G06N 3/08* (2006.01)
*G06N 3/10* (2006.01)

(52) U.S. Cl.
CPC .............. *G06N 3/08* (2013.01); *G06F 17/13* (2013.01); *G06N 3/105* (2013.01)

(58) Field of Classification Search
CPC ........... G06N 3/08; G06N 3/105; G06F 17/13
USPC ........................................... 703/1, 2; 706/15
See application file for complete search history.

(56) References Cited

U.S. PATENT DOCUMENTS

| 2019/0156476 A1* | 5/2019 | Yoshida ................. G06V 10/56 |
| 2019/0303677 A1* | 10/2019 | Choutas ................ G06V 40/20 |
| 2019/0365341 A1* | 12/2019 | Chan .................... A61B 6/5258 |

OTHER PUBLICATIONS

Zeng, Xiaohui, et al., "Adversarial Attacks Beyond the Image Space", arXiv.1711.07183,v6, Apr. 6, 2019, 11 pages.

* cited by examiner

*Primary Examiner* — Andre Pierre Louis
(74) *Attorney, Agent, or Firm* — Kilpatrick Townsend & Stockton LLP

(57) ABSTRACT

Techniques for incorporating a black-box function into a neural network are described. For example, an image editing function may be the black-box function and may be wrapped into a layer of the neural network. A set of parameters and a source image are provided to the black-box function, and the output image that represents the source image with the set of parameters applied to the source image is output from the black-box function. To address the issue that the black-box function may not be differentiable, a loss optimization may calculate the gradients of the function using, for example, a finite differences calculation, and the gradients are used to train the neural network to ensure the output image is representative of an expected ground truth image.

20 Claims, 10 Drawing Sheets
(1 of 10 Drawing Sheet(s) Filed in Color)

INCORPORATING BLACK-BOX FUNCTIONS IN NEURAL NETWORKS

BACKGROUND

Neural networks are a fast growing tool for solving many problems. Neural networks can be trained to provide a result or solution by performing functions at each layer of the neural network that work toward the ultimate solution for which the neural network was intended. Neural networks require each layer to be fully differentiable in order to train the neural network to perform the functions for which it is intended. Accordingly, in order for a neural network to implement a function, the differentiability of the function needs to be known. This hinders the applicability of neural network based solutions. For example, many code programs already exist that implement functions, where it may be desirable to use the code programs in a neural network implementation, but this is not possible because it is not known whether the functions performed by these code programs are differentiable. As a result, such an existing function (referred to as a black-box function because all that is known is what inputs are provided to the function and the output generated by the function) is not used in neural networks.

BRIEF SUMMARY

Techniques described herein enable a black-box function that is configured to edit an image to be integrated into a neural network. In certain embodiments, inputs may be provided to a neural network, where the inputs include a reference image and a source image. The neural network is configured to edit the source image based upon the reference image using an image editing function. A parameter estimator layer of the neural network, based upon the reference image and the source image and using a pre-trained model, estimates a set of one or more parameter values for editing the source image. The source image and the parameter values are provided to a function layer of the neural network that executes the image editing function. The image editing function generates an output image corresponding to the source image with the parameter values applied to the source image. The output of the neural network is the output image. Other embodiments of this aspect include corresponding computer systems, apparatus, and computer programs recorded on one or more computer storage devices, each configured to perform the actions of the methods.

Implementations may include one or more of the following features. In some embodiments, the image editing function is a non-differentiable function. In some embodiments, the neural network receives a ground truth image, where the ground truth image represents the source image modified with attributes of the reference image. The parameter estimator layer is then trained based on the ground truth image, the reference image, the source image, and the output image. The parameter estimator layer may be trained using a loss function to adjust weights associated with output nodes of the parameter estimator layer where each output node is associated with one of the parameter values. In some embodiments, the parameter estimator layer estimates a gradient of the image editing function in a multi-dimensional hyperspace, where a number of dimensions of the multi-dimensional hyperspace is based on how many parameter values are generated by the parameter estimator layer. In some embodiments, weights associated with output nodes of the parameter estimator layer are adjusted based on the estimated gradient. The adjusted weights are applied to the parameter values output from the parameter estimator layer as input to the function layer. In some embodiments, the gradient is estimated using a finite-differences method. Implementations of the described techniques may include hardware, a method or process, or computer software on a computer-accessible medium.

The foregoing, together with other features and embodiments will become more apparent upon referring to the following specification, claims, and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
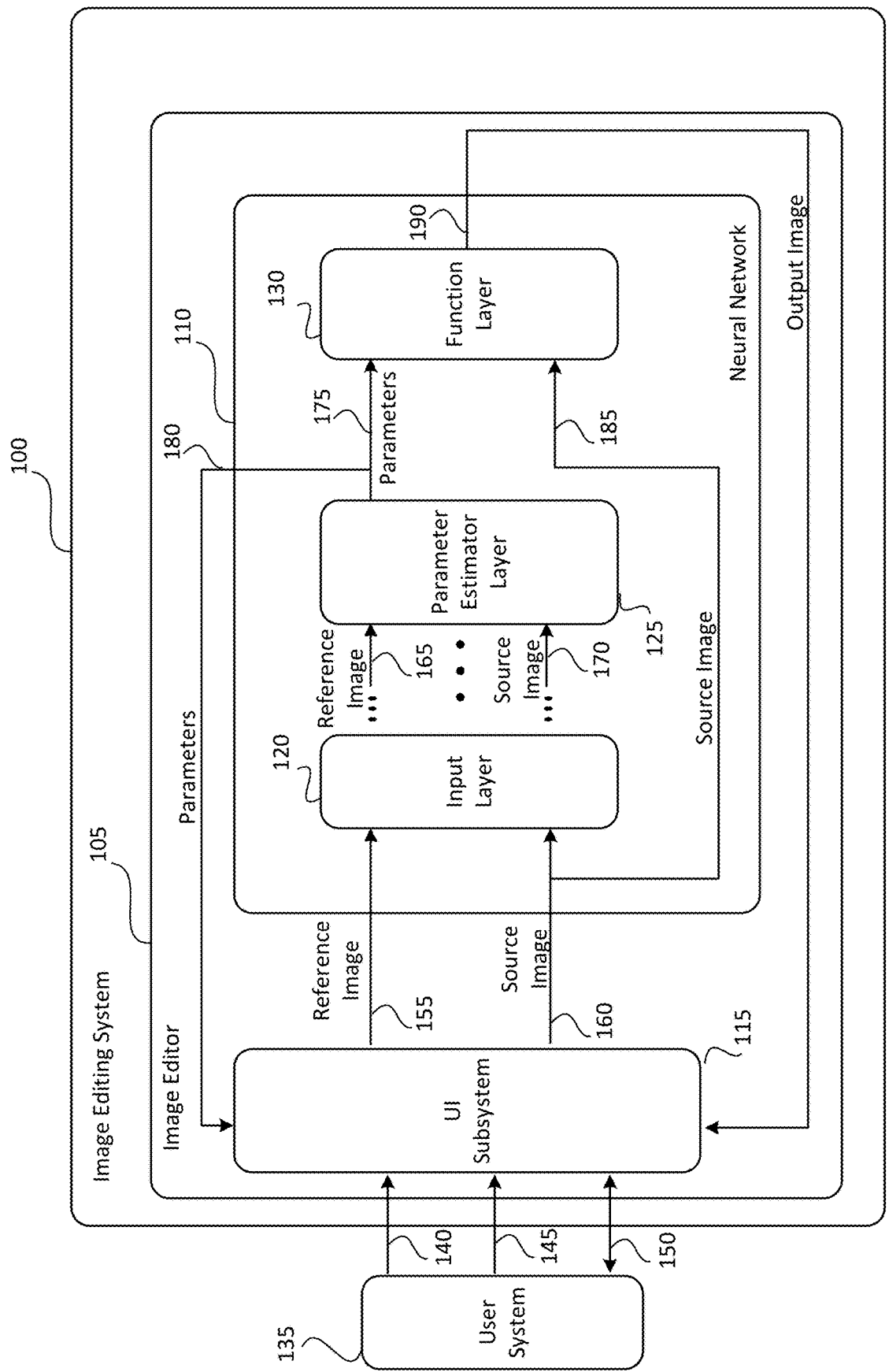
FIG. 1 illustrates a simplified block diagram of a system using a black-box function in a neural network, according to some embodiments.

In the following description, for the purposes of explanation, specific details are set forth to provide a thorough understanding of certain inventive embodiments. However, it will be apparent that various embodiments may be practiced without these specific details. The figures and description are not intended to be restrictive.

This disclosure relates generally to integrating black-box functions into a layer of a neural network. The problem addressed is that, in current implementations, neural networks require that all functions implemented by the layers of the neural network have to be differentiable. A layer of the neural network can be generally a function coded as the layer. In cases in which the function is coded as the layer, if the function is not differentiable, the layer is also not differentiable. When the function is differentiable, it means that at all points of the function, a derivative may be calculated. Many legacy functions exist that perform valuable functions, where it is desirable that the function (e.g., the code or program implementing the function) could be integrated into a layer of the neural network, except that it is often unknown whether the legacy function is differentiable. In other words, the legacy function may be a black-box function for which all that is known is the required inputs provided to the function and the output generated by the function. However, the content of the function may be unknown, including whether it is differentiable. If the function is not differentiable, in current implementations, the neural network cannot be trained.

A solution for including the black-box functions within the neural networks, regardless of whether the black-box function is differentiable, is to generate a differential approximation of the layer containing the black-box function without having to actually differentiate the layer. The differential approximation can be calculated by estimating a gradient of the layer containing the black-box function and using that estimated gradient during training to optimize the loss calculation used to train the neural network. In doing so, the layer is differentiable, or a reasonable approximation of differentiable, which is sufficient to utilize the function as a layer in the neural network and retain the ability to train.

This particular issue is relevant to image editing and processing functions. Existing image editing and processing tools provide functions for various image editing functionalities including, for example, color mapping. With respect to the color mapping example, a function implementation may already exist that is configured to receive specific parameter values and a source image as input and adjust the coloring of the source image according to the parameter values. Existing tools offer this type of color match feature, but they are based on rules and do not leverage any machine learning techniques, such as the use of neural networks. The present disclosure enables such a function to be integrated into a neural network. This enables the function to be used in the context of a neural network thereby leveraging all the advantages offered by machine learning techniques such as a neural network. For example, the neural network can be trained to learn semantically meaningful color mappings. Such a semantic learning solution can outperform existing hand-designed tools. The proposed solution includes wrapping the image editing function in a layer of a neural network and approximating the gradients associated with each parameter to make the black-box function appear differentiable and allow the neural network to be trained whether the black-box function is differentiable or not.

More specifically, in order to overcome that the function layer may not be fully differentiable or whether it is differentiable is unknown, the gradient of the function layer may be generated in the loss optimization function and used to tune the parameter estimator layer output weights. The loss optimization function can use finite differences to approximate the gradients of the black box function. The gradient for each parameter can be generated such that the gradients are generated in a multi-dimensional hyperspace, where the number of dimensions is based on the number of parameters used in the neural network. This gradient estimation is used to train the neural network eliminating the need for the black-box function to be differentiable.

Referring to the drawings, FIG. 1 illustrates an image editing system 100. The image editing system 100 may provide an image editor 105 that incorporates a neural network 110 for providing image editing functionality to a user. The user may use user system 135 to access the image editing system 100. The image editing functionality may include image processing or image editing.

Figure 7:
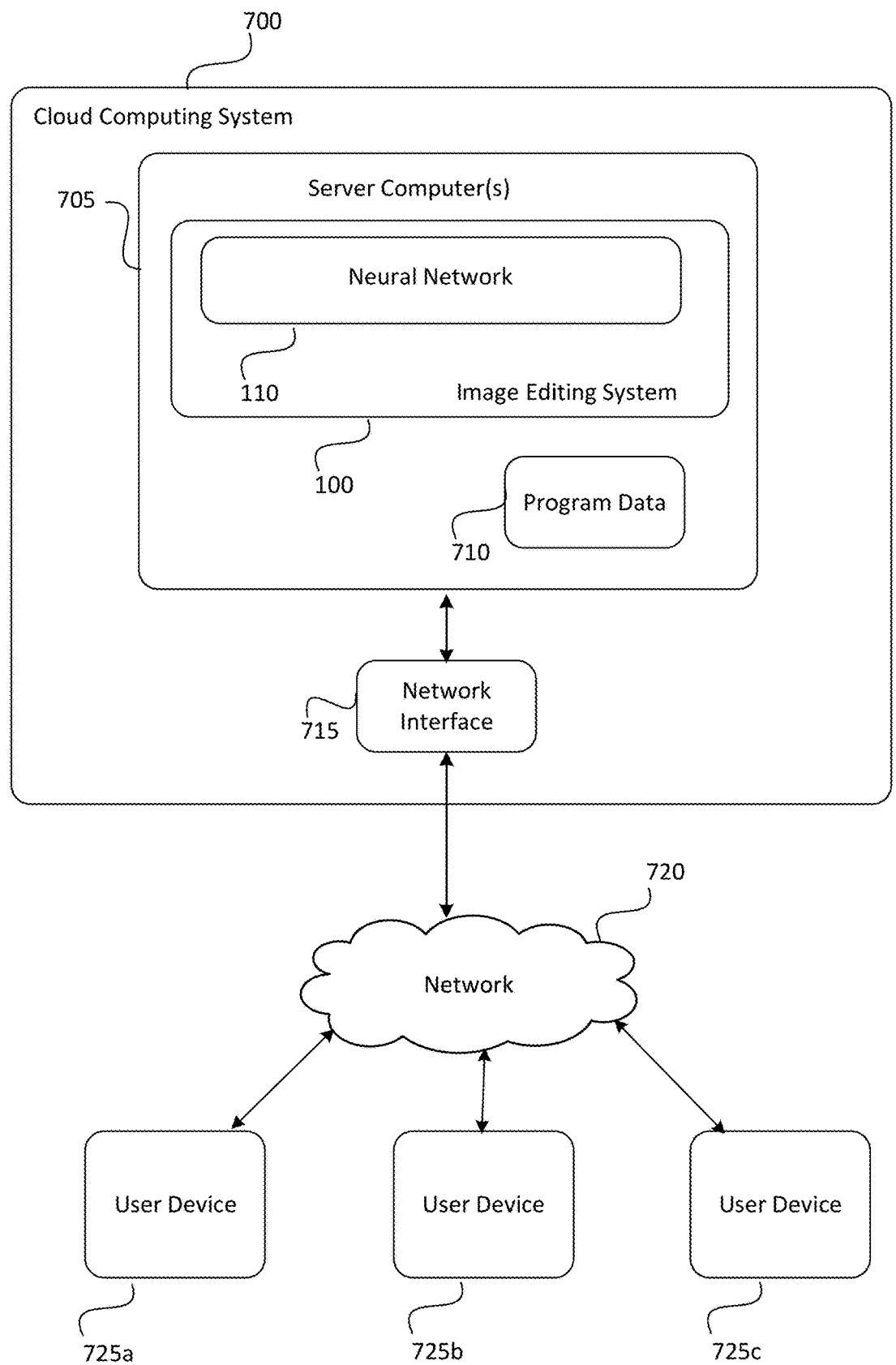
FIG. 7 illustrates an example of a cloud computing system for implementing certain embodiments described herein.
Figure 8:
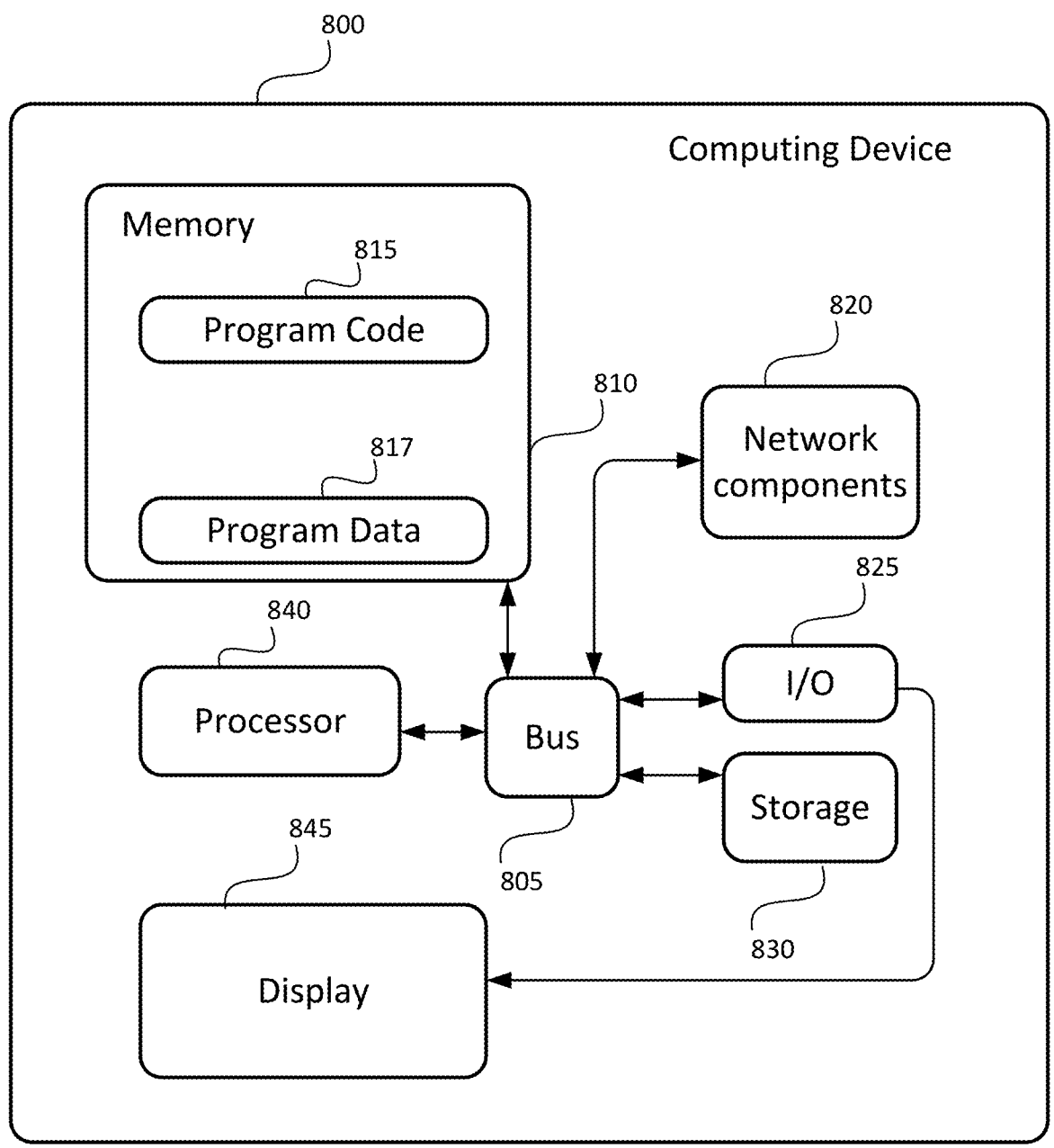
FIG. 8 illustrates an example of a computing system for implementing certain embodiments described herein.

User system 135 may be any suitable computer system including, for example, user device 725 of FIG. 7 and/or computing device 800 of FIG. 8. A user may utilize user system 135 to access the image editing system 100 via user interface (UI) subsystem 115.

Image editing system 100 may any suitable computer system including, for example, server computer 705 of FIG. 7 and/or computing device 800 of FIG. 8. Image editing system 100 may provide image editing functionality to users including an image editor 105. Image editing functionality may include the ability to edit images regarding the size, shape, color, or any other attribute of an image or portion of an image. For example, as used throughout, a color mapping feature may be provided in which the colors of a reference image may be mapped to a source image to modify the source image to have coloring similar to one or more portions of the reference image. Examples of such color mapping are described in more detail with respect to FIG. 5.

Image editor 105 may be implemented using software, hardware, firmware, or any combination thereof. Image editor 105 may include UI subsystem 115 via which a user may access the image editor 105 using a user system 135. Image editor 105 may also include a neural network 110 for performing some or all of the image editor 105 functionality.

Neural network 110 may include an input layer 120, a parameter estimator layer 125, and a function layer 130. The input layer 120 may be used to receive the inputs for the neural network 110 and perform initial processing. While only three layers are depicted in FIG. 1, the neural network 110 may include many layers, indicated by the three dots between the input layer 120 and the parameter estimator layer 125.

The parameter estimator layer 125 may include functions used to estimate parameters used by the function layer 130. The parameters may include any parameters used for image editing including, for example, hue, saturation, and gain, and for each of those for the various tones including highlight, midtone, and shadow (e.g., midtone hue or shadow saturation). The parameter estimator layer 125 may receive the source image and the reference image to generate the parameter values to be used to map the source image to the reference image. For example, for color mapping, the parameter values may be those estimated to apply to the source image such that the output image when the parameters are applied to the source image the colors of the output image will be mapped to those of the reference image.

The parameter estimator layer 125 may generate the parameters that may include, for example nine (9) separate parameters (e.g., highlight hue, highlight saturation, highlight gain, midtone hue, midtone saturation, midtone gain, shadow hue, shadow saturation, and shadow gain). An output node of the parameter estimator layer 125 may be used to output one of each of the parameters, such that a weight associated with the output node for each parameter may be adjusted to ensure the parameter values used by the function layer result in the expected output image. The weights associated with each output node may be adjusted during the training phase of building the model used by the parameter estimator layer 125 to estimate the parameters for each of the received reference and source images.

The parameter estimator layer 125 may include a loss optimization function that is used during training to train the model used for the parameter estimator layer 125. The training phase will be described in more detail with respect to FIG. 2. However, after the training phase, the parameter estimator layer 125 may include a pre-trained model used to estimate the parameter values for each parameter when a source image and reference image are received.

The function layer 130 may include the black-box function. The black-box function may be a function, including a legacy function, a new function, a function from an application that performs corresponding functionality, and the like. The black-box function may be written in any suitable programming language including, for example, C++. The developer of the neural network 110 will know at least the inputs needed for the black-box function and what is output from the black-box function. The black-box function is wrapped in a code layer of the neural network 110. In FIG. 1, the black-box function is wrapped in the function layer 130. The function layer 130 receives as input the inputs necessary to execute the black-box function. The function layer, once the inputs are received, executes the black-box function to generate the output.

The specific example used herein for the black-box function of the function layer 130 is an image editing function and more specifically a color mapping function used for image editing by image editor 105. The function layer 130 (and the black-box color mapping function) needs input of a source image and parameter values. Upon receipt of the parameter values and source image, the black-box function applies the parameter values to the source image to generate an output image that has modified colors over the source image. Accordingly, in use, beginning with user system 135, the user may provide a reference image indicated by arrow 140 and a source image as indicated by 145 using a user interface that is displayed or provided on user system 135 via UI subsystem 115. The UI subsystem 115 receives the reference image and source image and provides the reference image as shown by arrow 155 and the source image as shown by arrow 160 to the input layer 120 of the neural network 110. Within the neural network 110, the source image is also routed to the function layer as shown by arrow 185.

Once the input layer 120 receives the reference and source images, the input layer 120 may process the images in some embodiments. The source and reference images may further go through other layers of the neural network 110. The reference image as shown by arrow 165 and the source image as shown by arrow 170 are provided within neural network 110 to parameter estimator layer 125. The parameter estimator layer may apply a pre-trained model to the reference image and source image to generate parameter values for multiple parameters (e.g., the nine parameters described above for color mapping such as midtone gain). The output nodes of the parameter estimator layer 125 may be weighted, and such weighting may be applied to the parameter values and provided to the function layer as shown by arrow 175. The weighted parameter values may also be provided to the UI subsystem 115 as shown by arrow 180.

The function layer 130, having received the parameters and the source image, may execute the black-box function (e.g., the color mapping function) using the parameters and source image to generate an output image. The execution of the black-box function may, for example, apply the parameter values to the source image to generate the output image. The output image can then be provided to the UI subsystem 115 as shown by arrow 190. As shown in FIG. 1, the function layer 130 may be the "last" or "topmost" or "output" layer of the neural network 110.

The UI subsystem may then provide the output image received from the function layer as well as the parameter values received from the parameter estimator layer to the user via the user interface on the user system 135. An example user interface is described with respect to FIG. 6.

Figure 2:
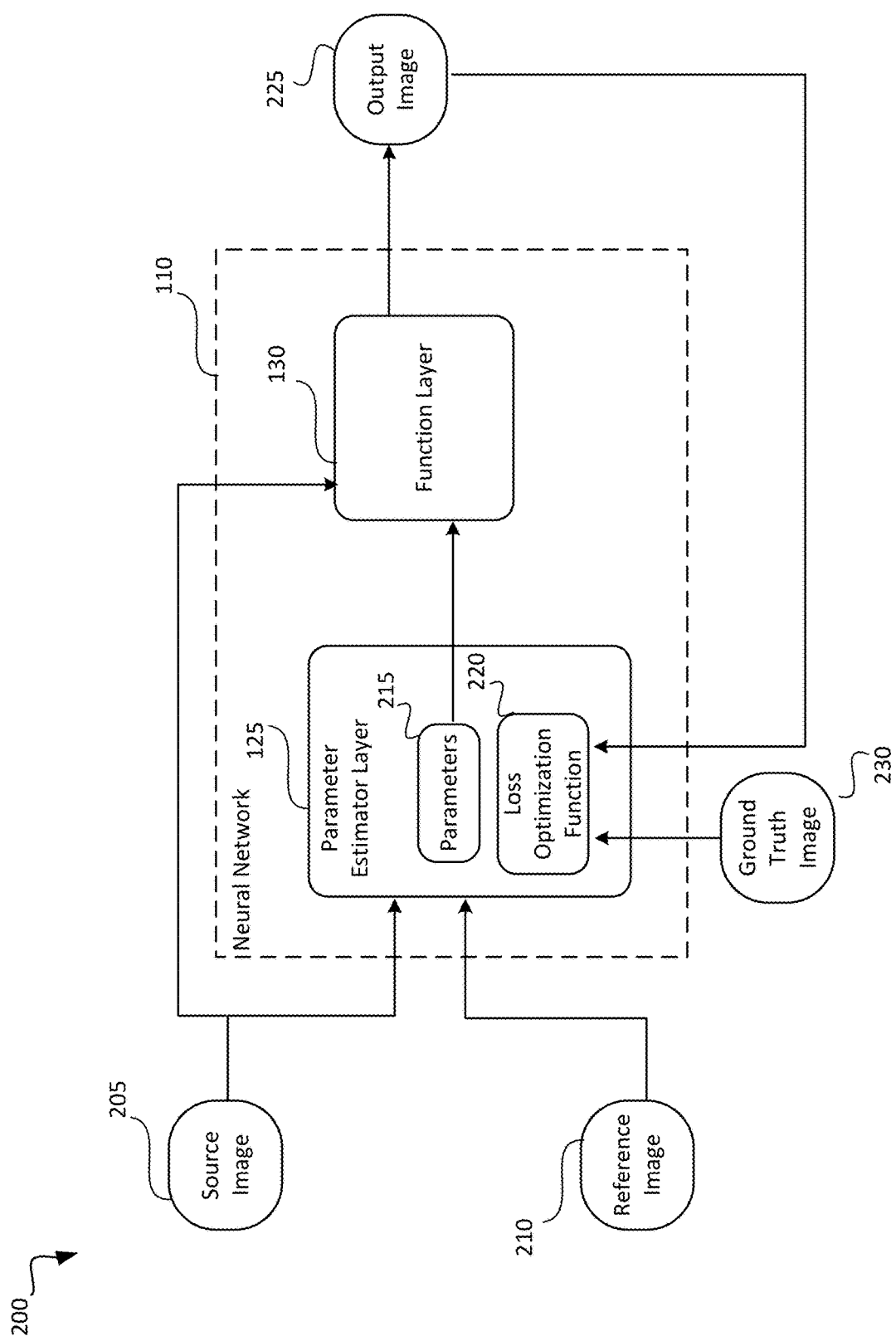
FIG. 2 illustrates a simplified block/flow diagram of training a neural network having a black-box function within a layer, according to some embodiments.

FIG. 2 illustrates a training flow 200 that includes portions of the image editing system 100 in a simplified flow diagram used for training the neural network 110 such that the pre-trained model of parameter estimator layer 125 generates parameter values that are weighted such that the output of the function layer 130 is what the user expected.

Continuing with the image editing function example for the black-box function wrapped within function layer 130, the neural network 110 in this example is configured to edit an image based on estimated parameters from the parameter estimator layer 125 and the source image 205. Training flow 200 includes a source image 205, a reference image 210, a ground truth image 230, an output image 225, and the neural network 110. The neural network 110 includes, as discussed with respect to FIG. 1, a parameter estimator layer 125 and a function layer 130. The parameter estimator layer 125 includes loss optimization function 220.

The training flow 200 may begin with a user providing to the image editing system 100 a source image 205 and a reference image 210. The user may wish to have the source image 205 adjusted to look similar to the reference image 210 and be training the neural network 110. Such image editing may include, for example, color mapping, sizing, and the like. Within the neural network 110, the source image 205 and reference image 210 may be provided to the parameter estimator layer 125.

The parameter estimator layer 125 may analyze the source image 205 and the reference image 210 using a model to generate parameters 215. The parameters 215 may then be transmitted to the function layer 130. The parameters 215 may include multiple parameters, each of which may be associated with an output node of the parameter estimator layer 125. Weights associated with each output node may determine the parameter values used by the function layer 130. For example, as the neural network 110 is trained, the weights associated with each output node may be adjusted to better ensure the parameter values applied to the source image 205 results in the expected output image 225.

In addition to the parameters 215, the function layer 130 may receive the source image 205. The function layer 130 may execute the black-box function (e.g., an image editing function wrapped in the function layer 130 of the neural network 110) using the parameters 215 and the source image 205. The function layer 130 may, by executing the black-box function, apply the parameters 215 to the source image 205. The function layer 130 may output an output image 225 representing the source image 205 having the parameters 215 applied to it.

The output image 225 may be provided to the loss optimization function 220 of the parameter estimator layer 125. In addition, a ground truth image 230 may be provided to the loss optimization function 220. The ground truth image may be an image generated by a person or system that represents an expected image based on the received source image 205 and reference image 210. For example, if the image editing function (i.e., black-box function) wrapped in the function layer is a color mapping function such that parameters for colors from the reference image 210 are applied to the source image 205, the ground truth image 230 may be an image of the source image 205 with expected color mapping from the reference image 210.

The loss optimization function 220 can calculate the gradient of the output image. In some embodiments, a finite differences calculation can be used to calculate the gradient. In some embodiments each parameter generated by the parameter estimator layer 125 can be moved up and down by some epsilon amount. The black-box function is evaluated with these modified parameter values and estimates of each gradient for each parameter is created. The central difference method may be used such that the derivative of the black-box function with respect to each parameter is given by the equation:

$$\frac{\partial f(x)}{\partial x} \approx \frac{f(x+h)-f(x-h)}{2h},$$

where f(x) represents the function and h is the epsilon amount moved for each parameter. Once the derivative of the black-box function with respect to each parameter is estimated, the derivative of the loss with respect to the parameters is calculated using the chain rule. In this way, the derivative of the black-box function is generated in a multi-dimensional hyperspace where the number of dimensions depends on the number of parameters. In the case of the color mapping function discussed above, nine (9) parameters are generated and used, so the multi-dimensional hyperspace may include nine dimensions.

The loss optimization function 220 adjusts the weights associated with each output node of the parameter estimator layer 125 such that, when training is completed, estimated parameters by the parameter estimator layer 125 output at each output node to the function layer 130 results in an output image 225 that is similar to the ground truth image 230. The weighted values from the output nodes are used to apply the black-box function to the source image 205, which results in an output image 225 to have an appearance that is substantially similar to the appearance of the ground truth image 230. Stated differently, the parameter values, when applied to the source image 205 using the black-box function, adjust the appearance of the source image 205 to result in the output image 225 to have an appearance that is substantially similar to the appearance of the ground truth image 230. The parameter values used to generate the output image 225 may vary depending on the black-box function and how the model is trained. For example, a color-mapping black-box function within a neural network that is trained to match the colors will generate output images that have color parameters that result in an output image having an appearance substantially similar to the appearance of the ground truth image 230. Upon completion of training, the parameter estimator layer 125 may include a pre-trained model, generated during training, that is used to apply to the source image 205 and reference image 210 that can generate parameters that, when applied to the source image 205 by the function layer 130 generates an output image 225 that is substantially similar to the ground truth image 230.

In some embodiments, training of the neural network 110 continues for every source image and reference image provided, even if provided by an end user and an output image 225 is provided to the user via the user system 135. In other words, runtime use of the image editing system 100 and training of the neural network 110 may happen concurrently.

In some embodiments, depending on the ground truth image 230 that is provided to train the neural network 110, the neural network may learn semantic identification. This semantic identification may include specific features within the images including, for example, object identification. To illustrate the possible identifications, imagine the source image 205 includes images of people and animals and the reference image 210 includes people and animals. Imagine also that the source image 205 is in color, while the reference image is in black and white except that the animals within the image are in color. The ground truth image 230 may modify the source image to black and white, leaving only the animals in color. Given this scenario, the neural network 110 may learn to identify animals. In addition, the neural network 110 may learn to generate an output image 225 where the image is black and white except that animals are in color. This is just one example of the possibilities of semantic identification that can be learned by neural network 110.

Figure 3:
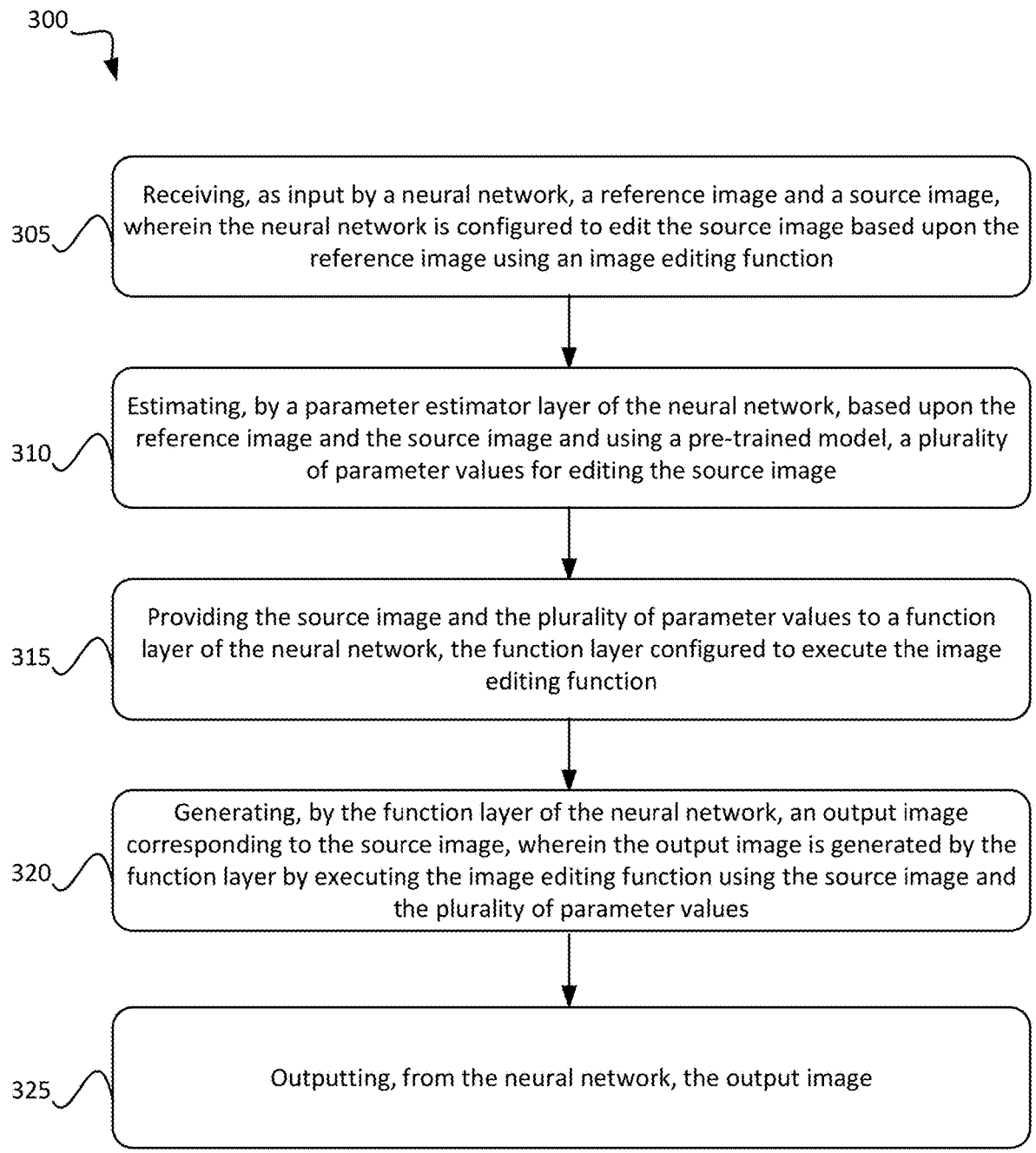
FIG. 3 illustrates a method for using a black-box function in a neural network, according to some embodiments.

FIG. 3 illustrates a method 300 for runtime image editing using a neural network with a black-box function wrapped in a layer of the neural network. Method 300 may include more or fewer steps than described without deviating from the scope of the application. Method 300 may be performed by, for example, image editing system 100.

Method 300 begins at step 305 with the neural network receiving as input a reference image and a source image. For example, neural network 110 may receive a reference image and a source image. The neural network 110 may receive the reference image and source image from a user using a user system 135 and interacting with the image editor 105 via UI subsystem 115. The neural network is configured to edit the source image based upon the reference image using an image editing function. The neural network 110 may include a function layer, such as function layer 130, that has wrapped into the neural network 110 an image editing function (i.e., a black-box function). The image editing function may, for example, color map the source image to the reference image or adjust other parameters associated with the image to make the source image include attributes and/or features of the reference image.

At step 310 a parameter estimator layer of the neural network estimates, based upon the reference image and the source image and using a pre-trained model, parameter values for editing the source image. For example, parameter estimator layer 125 may apply the model generated during training flow 200 to the reference image and source image to generate parameters such as hue, gain, and saturation for each of highlight, midtone, and shadow. These parameters may be estimated using the model such that applying the parameters to the source image may result in an image that represents the source image having attributes of the reference image. In other words, for example, the resulting image may be of the source image color mapped to the reference image.

At step 315 the source image and the plurality of parameter values may be provided to a function layer of the neural network. The function layer may be configured to execute the image editing function. For example, the neural network 110 may include function layer 130 that receives the parameter values from the parameter estimator layer 125 and the source image from the UI subsystem 115.

At step 320 the function layer of the neural network generates an output image corresponding to the source image. The output image is generated by the function layer by executing the image editing function using the source image and the parameter values. For example, function layer 130 may execute the image editing (black-box) function using the source image and the parameter values to apply the parameter values to the source image. The result of executing the image editing function may be the output image that represents the source image with the parameter values applied to it.

At step 325 the neural network may output the output image. For example, neural network 110 may have as its last layer the function layer 130 such that the output of the function layer 130 is the output image, which is the output of the neural network 110.

Figure 4:
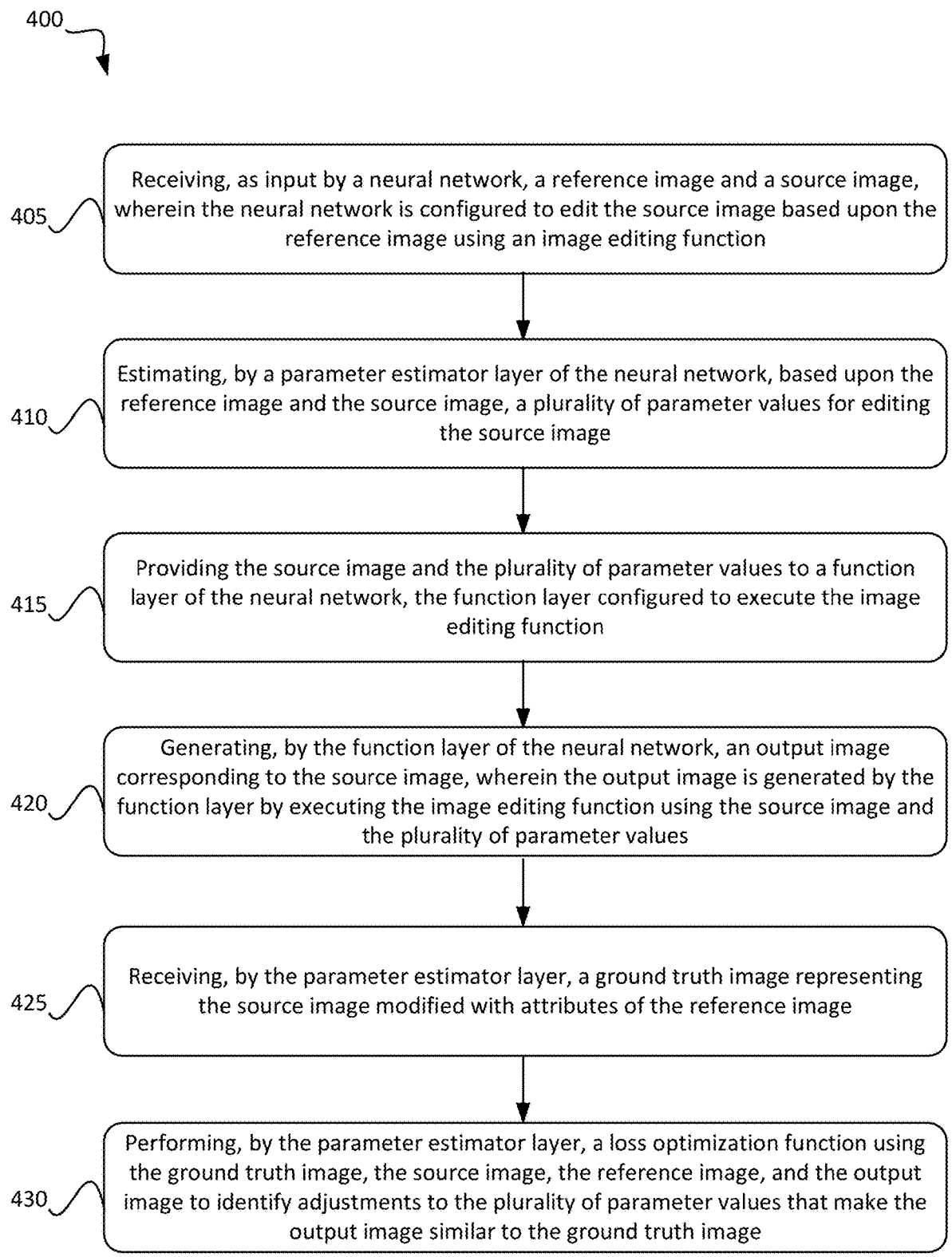
FIG. 4 illustrates a method for training a neural network having a black-box function in a layer, according to some embodiments.

FIG. 4 illustrates a method 400 for training a neural network with a black-box function wrapped in a layer of the neural network. Method 400 may include more or fewer steps than described without deviating from the scope of the application. Method 400 may be performed by, for example, image editing system 100 as described with respect to FIG. 2.

Method 400 begins at step 405 with the neural network receiving as input a reference image and a source image. For example, neural network 110 may receive a reference image 210 and a source image 205. The neural network 110 may receive the reference image 210 and source image 205 from a user using a user system 135 and interacting with the image editor 105 via UI subsystem 115. The neural network is configured to edit the source image based upon the reference image using an image editing function. The neural network 110 may include a function layer, such as function layer 130, that has wrapped into the neural network 110 an image editing function (i.e., a black-box function). The image editing function may, for example, color map the source image 205 to the reference image 210 or adjust other parameters 215 associated with the reference image 210 to make the source image 205 include attributes and/or features of the reference image 210.

At step 410 a parameter estimator layer of the neural network estimates, based upon the reference image and the source image, parameter values for editing the source image. For example, parameter estimator layer 125 may apply a model that is being trained to the reference image 210 and source image 205 to generate parameters 215 such as hue, gain, and saturation for each of highlight, midtone, and shadow resulting in nine parameters. These parameters 215 may be estimated using the model such that applying the parameters 215 to the source image 205 may result in an image that represents the source image 205 having attributes of the reference image 210 including the hue, gain, and saturation for each of highlight, midtone, and shadow. In other words, for example, the resulting image may be of the source image 205 color mapped to the reference image 210.

At step 415 the source image and the parameter values may be provided to a function layer of the neural network. The function layer may be configured to execute the image editing function. For example, the neural network 110 may include function layer 130 that receives the parameter values 215 from the parameter estimator layer 125 and the source image 205 from the UI subsystem 115.

At step 420 the function layer of the neural network generates an output image corresponding to the source image. The output image is generated by the function layer by executing the image editing function using the source image and the parameter values. For example, function layer 130 may execute the image editing (black-box) function using the source image 205 and the parameter values 215 to apply the parameter values 215 to the source image 205. The result of executing the image editing function may be the output image 225 that represents the source image 205 with the parameter values 215 applied to it.

At step 425 the parameter estimator layer may receive a ground truth image representing the source image modified with attributes of the reference image. For example, parameter estimator layer 125 may receive ground truth image 230. As described with respect to FIG. 2, ground truth image 230 may be generated by a person or system that represents the source image 205 modified with attributes of the reference image 210 such as, for example, coloring of the reference image 210.

At step 430 the parameter estimator layer may perform a loss optimization function using the ground truth image, the source image, the reference image, and the output image to identify adjustments to the parameter values that, when applied to the source image using the image editing function, cause the output image to have an appearance that is substantially similar to the appearance of the ground truth image. For example, the parameter estimator layer 125 may execute loss optimization function 220 using the ground truth image 230, the source image 205, the reference image 210, and the output image 225. The loss optimization function 220 can calculate the gradient of the function layer 130 and use that gradient to calculate the derivative of the loss with respect to the parameters. The derivative of the loss can be used to adjust the weights associated with each output node of the parameter estimator layer 125 such that estimated parameters by the parameter estimator layer 125 output at each output node to the function layer 130 results in an output image 225 that is substantially similar to the ground truth image 230.

Figure 5:
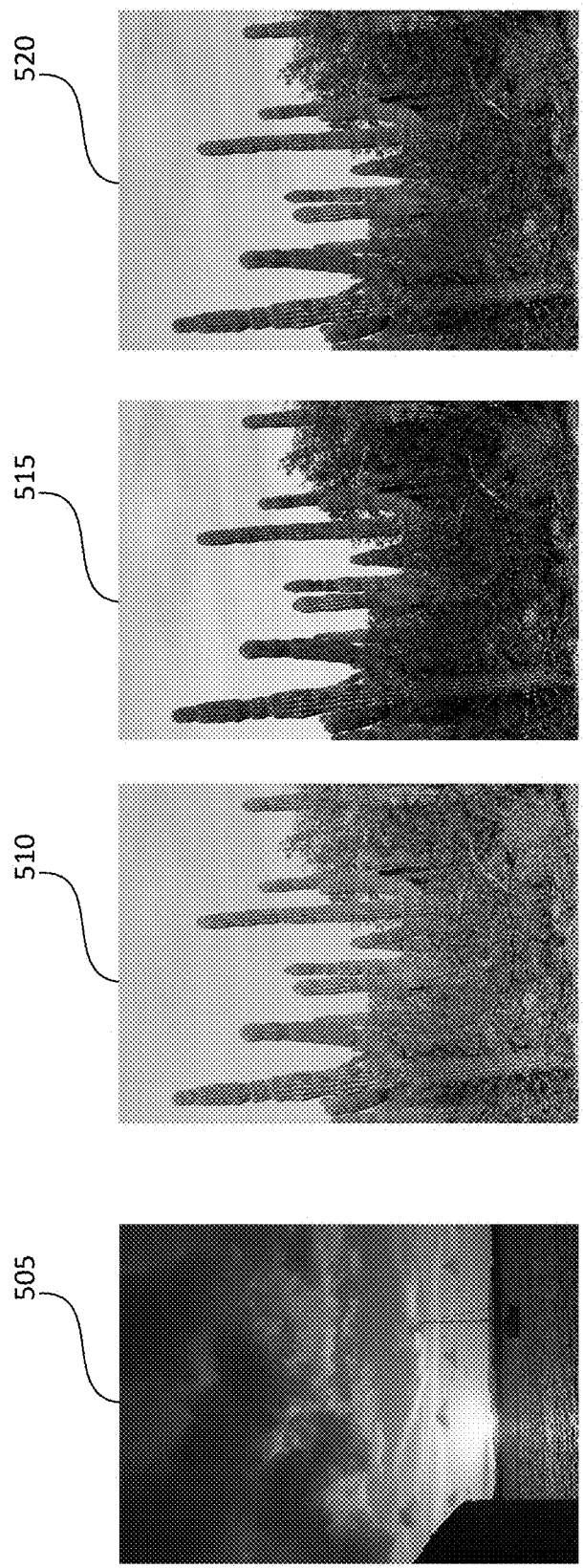
FIG. 5 illustrates an example of images used by and created by an image editing black-box function, according to some embodiments.

FIG. 5 illustrates example images that may be used in training the neural network 110 as described with respect to FIG. 2. For example, reference image 210 may be example reference image 505. Further, source image 205 may be example source image 510. As shown, the coloring of the example reference image 505 has a darker sky due to sunset than the example source image 510, which has a brighter, daytime coloring. Output image 225 may be example output image 515. Output image 515 may be generated by executing the function layer 130 on source image 510 with estimated parameters generated by parameter estimator layer 125 using a model and the example reference image 505. As seen, the example output image 515 has a slightly darker sky with more of a sunset tone than example source image 510. The sunset tone of output image 515 is similar to the sunset tone of example reference image 505. Ground truth image 230 may be example ground truth image 520. Output image 515 has an appearance that is substantially similar to ground truth image 230. These example images are not meant to limit the scope of the application but instead show a specific example of a color mapping neural network example with a wrapped black box image editing function within a layer of the neural network.

Figure 6:
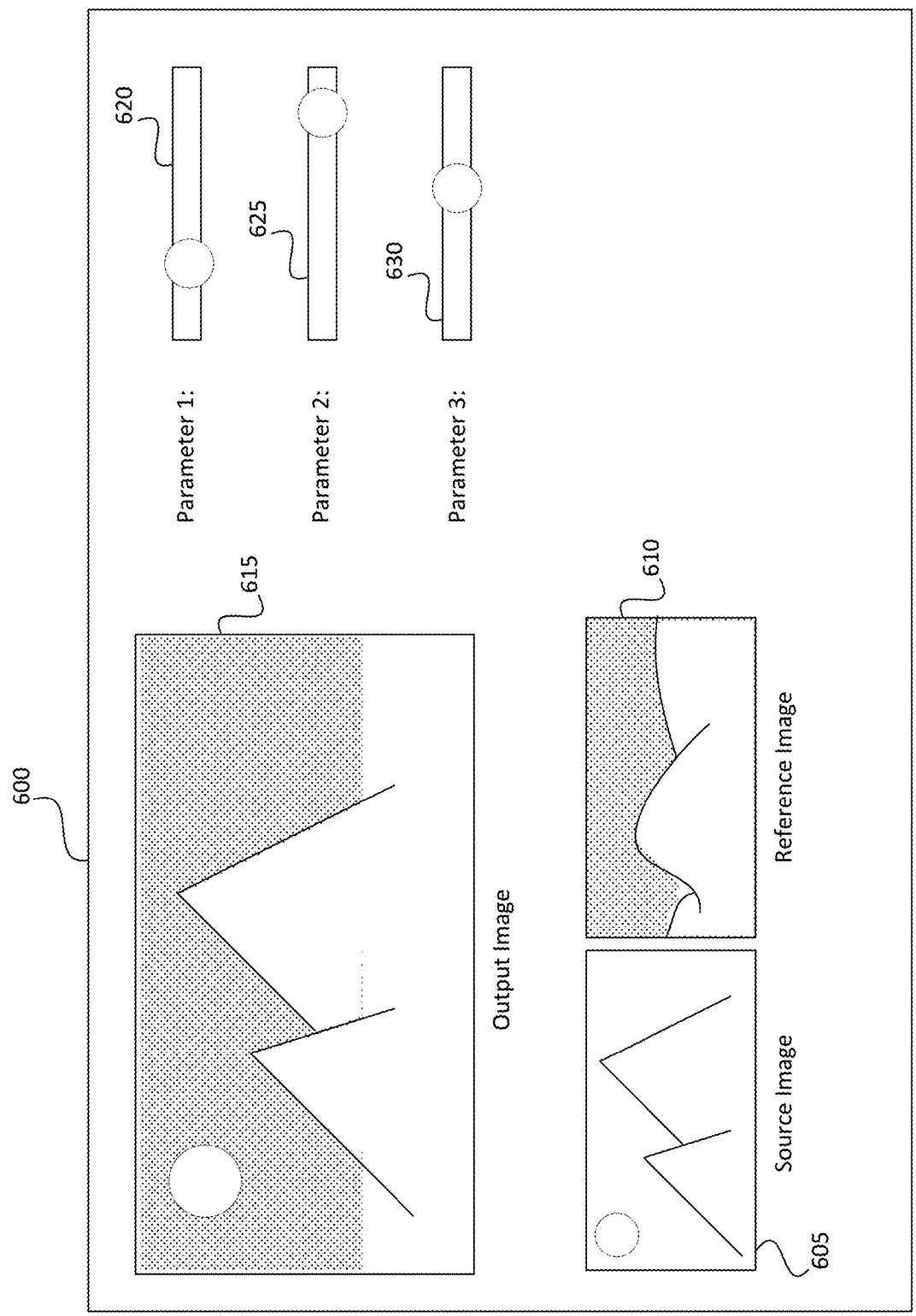
FIG. 6 illustrates an example user interface, according to some embodiments.

FIG. 6 illustrates an example user interface 600. The user interface 600 may be provided on a display of user system 135 and communicate with neural network 110 via UI subsystem 115. The user interface 600 is a simplified interface intended to show an exemplary embodiment. User interface 600 includes output image 615, source image 605, reference image 610, parameter 1 slider 620, parameter 2 slider 625, and parameter 3 slider 630. With respect to FIG. 1, the user using user interface 600 on user system 135 may select source image 605 and reference image 610 for providing via UI subsystem 115 to the neural network 110. The neural network 110 receives the reference image 610 and source image 605 at the input layer 120 via the UI subsystem 115. Additionally, the source image is provided to the function layer 130. The parameter estimator layer 125 receives the source image 605 and reference image 610 and applies the pre-trained model to the source image 605 and reference image 610 to generate parameters. The parameters are provided to the function layer 130 as well as back to the UI subsystem 115. The function layer 130 executes the black-box function on the source image 605 to apply the parameters from the parameter estimator layer 125 to generate the output image 615, and the output image 615 is provided to the UI subsystem 115. The UI subsystem 115 provides the output image 615 to the user via the user interface 600. Additionally, the parameters are provided via the user interface 600 such that parameters are each manifested in a control such as parameter 1 slider 620, parameter 2 slider 625, and parameter 3 slider 630. These controls, while depicted as sliders, may be in any suitable control format including a dial, knob, numerical entry value, and so forth.

Within user interface 600, once the output image 615 and parameter sliders 620, 625, and 630 are provided via the user interface, the user may modify the parameter values by using the controls including parameter 1 slider 620, parameter 2 slider 625, and parameter 3 slider 630. Upon modification of the parameter values using the controls, the output image 615 may adjust because the modified parameter values may be applied to the source image. For example, an image editing function such as that is wrapped in the function layer 130 may be used to apply the modified parameter values. For example, a copy of the image editing function may be in image editor 105 that may be executed to apply the modified parameter values to the source image without use of the neural network 110. The neural network 110 is not further needed because the parameter estimation is complete and adjusted parameters are used that need only be applied.

In the example shown in FIG. 6, the source image 605 includes a mountain scape with a light background. The reference image 610 includes an uneven ground scape with a darker background. The output image 615 therefore, as an example, is the mountain scape of source image 605 modified with the darker background of reference image 610.

Examples of Computing Environments for Implementing Certain Embodiments

Any suitable computing system or group of computing systems can be used for performing the operations described herein. For example, FIG. 8 depicts an example of computing device 800 that may be at least a portion of image editing system 100. The implementation of the computing device 800 could be used for one or more of the image editor 105 or the user system 135. In an embodiment, a single image editing system 100 having devices similar to those depicted in FIG. 8 (e.g., a processor, a memory, etc.) combines the one or more operations and data stores depicted as separate subsystems in FIG. 1. Further, FIG. 7 illustrates a cloud computing system 700 by which at least a portion of the image editing system 100 may be offered.

In some embodiments, the functionality provided by the image editing system 100 may be offered as cloud services by a cloud service provider. For example, FIG. 7 depicts an example of a cloud computing system 700 offering an image editing service that can be used by a number of user subscribers using user devices 725a, 725b, and 725c across a data network 720. In the example, the image editing service may be offered under a Software as a Service (SaaS) model. One or more users may subscribe to the image editing service, and the cloud computing system performs the processing to provide the image editing service to subscribers. The cloud computing system may include one or more remote server computers 705.

The remote server computers 705 include any suitable non-transitory computer-readable medium for storing program code (e.g., an image editing system 100) and program data 710, or both, which is used by the cloud computing system 700 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 705 can include volatile memory, non-volatile memory, or a combination thereof.

One or more of the servers 705 execute the program code 710 that configures one or more processors of the server computers 705 to perform one or more of the operations that provide image editing services, including the ability to utilize the neural network 110 to perform image editing. As depicted in the embodiment in FIG. 7, the one or more servers providing the services to perform image editing via the neural network 110 may include access to the layers of the neural network 110 including the function layer 10 and the parameter estimator layer 125. Any other suitable systems or subsystems that perform one or more operations described herein (e.g., one or more development systems for configuring an interactive user interface) can also be implemented by the cloud computing system 700.

In certain embodiments, the cloud computing system 700 may implement the services by executing program code and/or using program data 710, which may be resident in a memory device of the server computers 705 or any suitable computer-readable medium and may be executed by the processors of the server computers 705 or any other suitable processor.

In some embodiments, the program data 710 includes one or more datasets and models described herein. Examples of these datasets include image data, new image content, image energy data, etc. In some embodiments, one or more of data sets, models, and functions are stored in the same memory device. In additional or alternative embodiments, one or more of the programs, data sets, models, and functions described herein are stored in different memory devices accessible via the data network 715.

The cloud computing system 700 also includes a network interface device 715 that enable communications to and from cloud computing system 700. In certain embodiments, the network interface device 715 includes any device or group of devices suitable for establishing a wired or wireless data connection to the data networks 720. Non-limiting examples of the network interface device 715 include an Ethernet network adapter, a modem, and/or the like. The image editing service 100 is able to communicate with the user devices 725a, 725b, and 725c via the data network 720 using the network interface device 715.

FIG. 8 illustrates a block diagram of an example computer system 800. Computer system 800 can be any of the described computers herein including, for example, image editor 105, user system 135, or server computer 705. The computing device 800 can be or include, for example, a laptop computer, desktop computer, tablet, server, or other electronic device.

The computing device 800 can include a processor 840 interfaced with other hardware via a bus 805. A memory 810, which can include any suitable tangible (and non-transitory) computer readable medium, such as RAM, ROM, EEPROM, or the like, can embody program components (e.g., program code 815) that configure operation of the computing device 800. Memory 810 can store the program code 815, program data 817, or both. In some examples, the computing device 800 can include input/output ("I/O") interface components 825 (e.g., for interfacing with a display 845, keyboard, mouse, and the like) and additional storage 830.

The computing device 800 executes program code 815 that configures the processor 840 to perform one or more of the operations described herein. Examples of the program code 815 include, in various embodiments, the neural network 110 including the parameter estimator layer 125 and the function layer 130, the image editing function, or any other suitable systems or subsystems that perform one or more operations described herein (e.g., one or more development systems for configuring an interactive user interface). The program code 815 may be resident in the memory 810 or any suitable computer-readable medium and may be executed by the processor 840 or any other suitable processor.

The computing device 800 may generate or receive program data 817 by virtue of executing the program code 815. For example, source image 205, reference image 210, ground truth image 230 and output image 225 are all examples of program data 817 that may be used by the computing device 800 during execution of the program code 815.

The computing device 800 can include network components 820. Network components 820 can represent one or more of any components that facilitate a network connection. In some examples, the network components 820 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 820 can be wired and can include interfaces such as Ethernet, USB, or IEEE 1394.

Although FIG. 8 depicts a single computing device 800 with a single processor 840, the system can include any number of computing devices 800 and any number of processors 840. For example, multiple computing devices 800 or multiple processors 840 can be distributed over a wired or wireless network (e.g., a Wide Area Network, Local Area Network, or the Internet). The multiple computing devices 800 or multiple processors 840 can perform any of the steps of the present disclosure individually or in coordination with one another.

Figure 9:
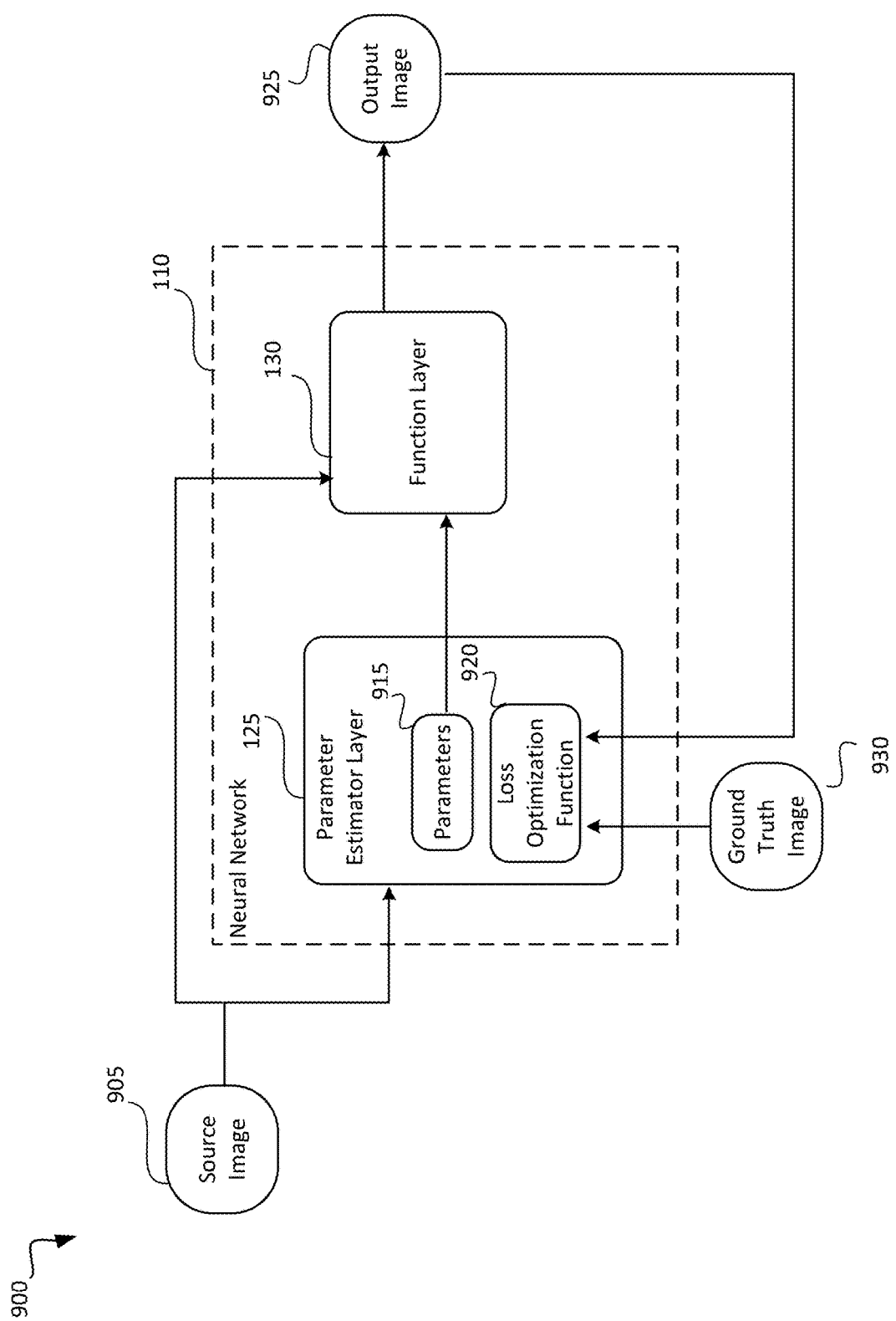
FIG. 9 illustrates a simplified block/flow diagram of training a neural network having a black-box function within a layer according to some embodiments.

FIG. 9 illustrates a training flow 900 that includes portions of the image editing system 100 in a simplified flow diagram used for training the neural network 110. While training flow 200 provided a specific implementation of a black-box function having a reference image, training flow 900 provides a more general implementation of a training a neural network with a black-box function for image processing. The function in function layer 130 can incorporate any image processing function that may use parameters to edit one or more source images 905. While a single source image 905 is shown, any number of input images maybe be provided that may be used for generating the parameter values for editing the source image 905. For example, two source images 905 may be input for processing that blend the two images. Regardless of the actual function included in function layer 130, what is known about the black-box function is that it is not differentiable, or it is unknown whether the black-box function is differentiable. The value of the training is to generate the pre-trained model of parameter estimator layer 125 that generates parameter values that are weighted such that the output of the function layer 130 is what the user expected.

Training flow 900 includes a source image 905, a ground truth image 930, an output image 925, and the neural network 110. The neural network 110 includes, as discussed with respect to FIG. 1, a parameter estimator layer 125 and a function layer 130. The parameter estimator layer 125 includes loss optimization function 920.

The training flow 900 may begin with a user providing to the image editing system 100 a source image 905. While more than one image may be provided, in the most general function a single source image 905 is input. The user may wish to have the source image 905 adjusted or processed. For example, the user may want to adjust the coloring of source image 905, remove components of source image 905, or perform any other processing. For training, within the neural network 110, the source image 905 is provided to the parameter estimator layer 125.

The parameter estimator layer 125 analyzes the source image 905 using a model to generate parameters 915. The initial model may be any model that will generate the parameters expected for and used by function layer 130. Initially, the model may not be optimized because the neural network 110 is not yet trained. The parameters 915 generated by parameter estimator layer 125 will be based on the parameters for use in the black-box function of function layer 130. Once generated by parameter estimator layer 125, the parameters 215 are transmitted to the function layer 130. The parameters 915 may include multiple parameters, each of which may be associated with an output node of the parameter estimator layer 125. Weights associated with each output node may determine the parameter values used by the function layer 130. For example, as the neural network 110 is trained, the weights associated with each output node may be adjusted to better ensure the parameter values applied to the source image 905 results in the expected output image 925.

In addition to the parameters 915, the function layer 130 may receive the source image 905. The function layer 130 may execute the black-box function (e.g., an image processing function wrapped in the function layer 130 of the neural network 110) using the parameters 915 and the source image 905. The function layer 130 may, by executing the black-box function, apply the parameters 915 to the source image 905. The function layer 130 may output an output image 925 representing the source image 905 having the parameters 915 applied to it.

The output image 925 may be provided to the loss optimization function 920 of the parameter estimator layer 125. In addition, a ground truth image 930 may be provided to the loss optimization function 920. The ground truth image may be an image generated by a person or system that represents an expected image based on the received source image 905 and in view of the black-box function. For example, if the image processing function (i.e., black-box function) wrapped in the function layer is a blending function such that parameters represent values used by the black-box function for two source images 905 to be blended, the ground truth image 930 may be an image of the two source images 905 blended in an expected or desired way.

The loss optimization function 920 can calculate the gradient of the output image. In some embodiments, a finite differences calculation can be used to calculate the gradient. In some embodiments each parameter generated by the parameter estimator layer 125 can be moved up and down by some epsilon amount. The black-box function is evaluated with these modified parameter values and estimates of each gradient for each parameter is created. The central difference method may be used such that the derivative of the black-box function with respect to each parameter is given by the equation:

$$\frac{\partial f(x)}{\partial x} \approx \frac{f(x+h)-f(x-h)}{2h},$$

where f(x) represents the function and h is the epsilon amount moved for each parameter. Once the derivative of the black-box function with respect to each parameter is estimated, the derivative of the loss with respect to the parameters is calculated using the chain rule. In this way, the derivative of the black-box function is generated in a multi-dimensional hyperspace where the number of dimensions depends on the number of parameters.

The loss optimization function 920 adjusts the weights associated with each output node of the parameter estimator layer 125 such that estimated parameters by the parameter estimator layer 125 output at each output node to the function layer 130 results in an output image 925 that is substantially similar to the ground truth image 930. Upon completion of training, the parameter estimator layer 125 may include a pre-trained model, generated during training, that is used to apply to the source image 905 to generate parameters that, when applied to the source image 905 by the function layer 130 generates an output image 925 that is substantially similar to the ground truth image 930.

In some embodiments, training of the neural network 110 continues for every source image 905 provided, even if provided by an end user, and an output image 925 is provided to the user via the user system 135. In other words, runtime use of the image editing system 100 and training of the neural network 110 may happen concurrently.

In some embodiments, depending on the ground truth image 930 that is provided to train the neural network 110, the neural network may learn semantic identification as described with respect to FIG. 2.

Figure 10:
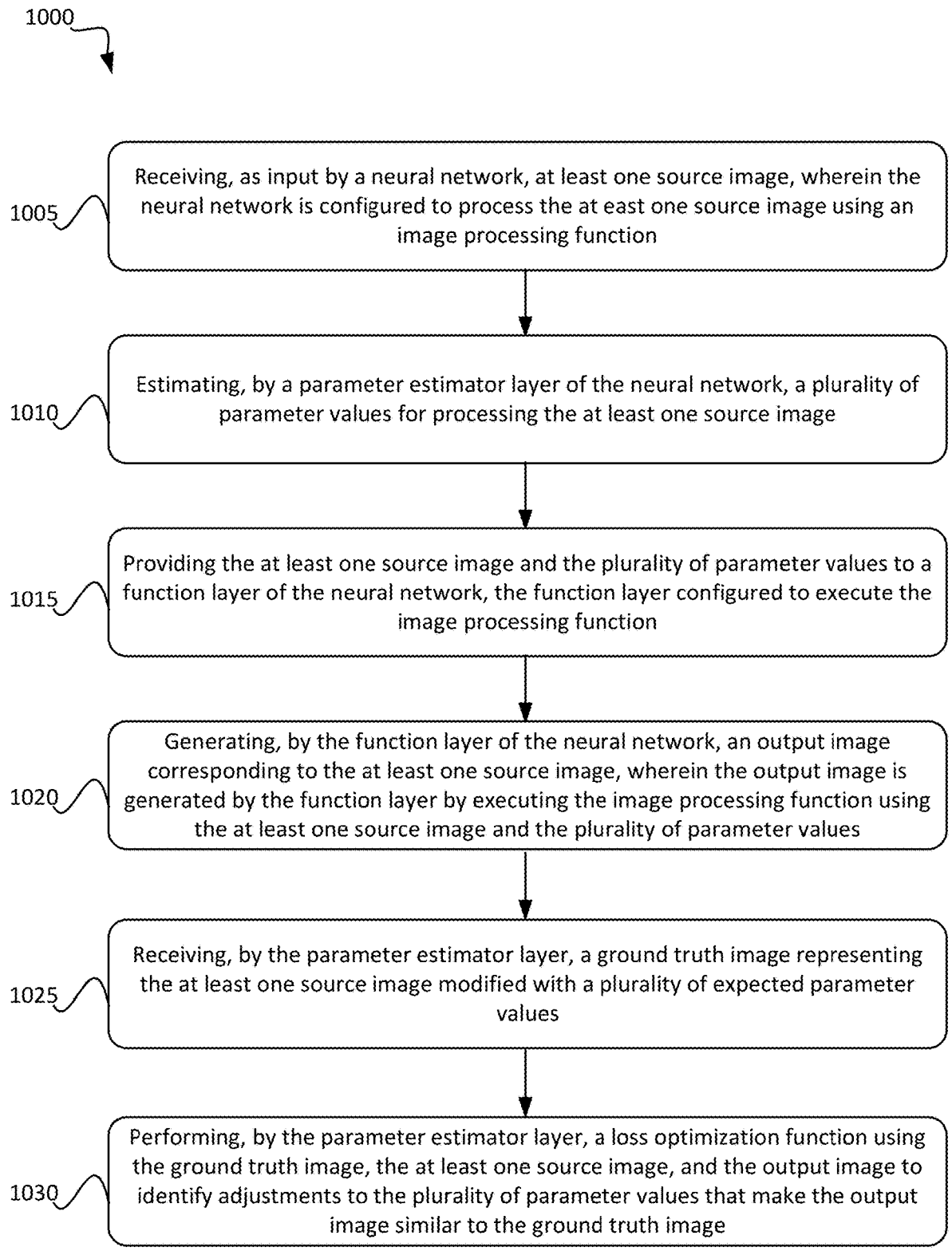
FIG. 10 illustrates a method for training a neural network having a black-box function according to some embodiments.

FIG. 10 illustrates a method 1000 for training a neural network having a black-box function wrapped in a layer of the neural network. Method 1000 may include more or fewer steps than described without deviating from the scope of the application. Method 1000 may be performed by, for example, image editing system 100.

Method 1000 begins at step 1005 with the neural network receiving as input at least one source image. The neural network 110 may receive the at least one source image from a user using a user system 135 and interacting with the image editor 105 via UI subsystem 115. The neural network is configured to process the source image using an image processing function. The neural network 110 includes a function layer, such as function layer 130, that has wrapped into the neural network 110 an image processing function (i.e., a black-box function). The image processing function may, for example, color map the source image to a reference image, blend two source images, or adjust other parameters associated with the image to make the source image include desired attributes and/or features. The actual function performed may be any image processing function. However, the function layer contains the black-box function for which the derivative is unknown and/or the function is not differentiable.

At step 1010 a parameter estimator layer of the neural network estimates parameter values for processing the at least one source image. For example, parameter estimator layer 125 may apply an initial model to the at least one source image to generate parameters such as hue, gain, and saturation for each of highlight, midtone, and shadow. The parameters estimated are based on the parameters needed by the black-box function for performing the image processing. These parameters may be estimated using the model such that applying the parameters to the source image may result in an image that represents the desired output image from the image processing function. Because the initial model is not yet trained, the actual output may not be the desired output image.

At step 1015 the at least one source image and the plurality of parameter values are provided to the function layer of the neural network. The function layer is configured to execute the image editing function. For example, the neural network 110 includes function layer 130 that receives the parameter values from the parameter estimator layer 125 and the at least one source image from the UI subsystem 115.

At step 1020 the function layer of the neural network generates an output image corresponding to the at least one source image. The output image is generated by the function layer by executing the image processing function using the at least one source image and the parameter values. For example, function layer 130 may execute the black-box image processing function using the at least one source image and the parameter values to apply the parameter values to the at least one source image. The result of executing the image processing function is the output image that represents the at least one source image with the parameter values applied to it.

At step 1025 the parameter estimator layer receives a ground truth image representing the at least one source image modified with expected parameter values. The ground truth image is the desired output from the black-box image processing function. The ground truth image can be generated by a system or a human and is intended to train the neural network to generate the proper parameter values at the parameter estimator layer.

At step 1030, the parameter estimator layer performs a loss optimization function using the ground truth image, the at least one source image, and the output image to identify adjustments to the parameter values that cause the output image to have an appearance that is substantially similar to the appearance of the ground truth image. The loss optimization function can calculate a gradient of the function. In some embodiments, each parameter generated by the parameter estimator layer can be moved up and down by some epsilon amount. The black-box function is evaluated with these modified parameter values and estimates of each gradient for each parameter is created. The central difference method is used with these gradients to calculate the derivative of the black-box function. The derivative is used to adjust the weights associated with the output nodes of each parameter so that the output image more closely matches the ground truth image. Once training is complete, the final weights associated with each node are used for the pre-trained model, which is the model used during run-time of the neural network.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A method performed by one or more computing systems, the method comprising:
    training a neural network configured to perform image processing to generate a pre-trained model, wherein the neural network comprises a function layer that includes an image processing function, and wherein training comprises calculating a gradient approximation of the function layer;
    receiving, as input by the neural network, at least one source image, wherein the neural network is configured to process the at least one source image using the image processing function;
    estimating, by a parameter estimator layer of the neural network and using the pre-trained model, a plurality of parameter values for processing the at least one source image;
    providing the at least one source image and the plurality of parameter values to the function layer of the neural network, the function layer configured to execute the image processing function;
    generating, by the function layer of the neural network, an output image corresponding to the at least one source image, wherein the output image is generated by the function layer by executing the image processing function using the at least one source image and the plurality of parameter values; and
    outputting, from the neural network, the output image.

2. The method of claim 1, wherein the image processing function is one of a function for which derivatives are unknown or a non-differentiable function.

3. The method of claim 1, further comprising:
    outputting the output image via a user interface;
    outputting the plurality of parameter values via the user interface; and
    enabling one or more of the plurality of parameter values to be modified via the user interface.

4. The method of claim 3, further comprising:
    receiving information indicating a change made to a first parameter value from the plurality of parameter values via the user interface;
    modifying the output image responsive to the change made to the first parameter value; and
    displaying the modified output image via the user interface.

5. The method of claim 1, wherein the image processing function is a function for color mapping such that the output image is a representation of the at least one source image color mapped to a reference image.

6. The method of claim 1, wherein the image processing function is written in C++ programming language.

7. The method of claim 1, wherein the training the neural network comprises:
    receiving, by the neural network, a ground truth image, wherein the ground truth image represents the at least one source image modified with a plurality of expected parameter values; and
    training the parameter estimator layer based on the ground truth image, the at least one source image, and the output image.

8. The method of claim 7, wherein training the parameter estimator layer comprises using a loss function to adjust a plurality of weights associated with output nodes of the parameter estimator layer, wherein each output node of the parameter estimator layer is associated with one of the plurality of parameter values.

9. The method of claim 1, wherein the calculating a gradient approximation of the function layer comprises estimating, by the parameter estimator layer, a gradient of the image processing function in a multi-dimensional hyperspace, wherein a number of dimensions of the multi-dimensional hyperspace is based on a number of the parameter values in the plurality of parameter values; and
    wherein the training the neural network further comprises adjusting, based on the estimated gradient, a plurality of weights associated with output nodes of the parameter estimator layer, wherein each output node of the parameter estimator layer is associated with one of the plurality of parameter values.

10. The method of claim 9, wherein the gradient is estimated using a finite-differences method.

11. The method of claim 1, wherein the plurality of parameter values are for a plurality of parameters, and wherein the plurality of parameters comprises at least one of shadow hue, midtone hue, highlight hue, shadow saturation, midtone saturation, highlight saturation, shadow gain, midtone gain, or highlight gain.

12. The method of claim 1, wherein the function layer is an output layer of the neural network.

13. A method performed by one or more computing systems, the method comprising:

receiving, as input by a neural network, at least one source image, wherein the neural network is configured to process the at least one source image using an image processing function;

estimating, by a parameter estimator layer of the neural network, a plurality of parameter values for processing the at least one source image;

outputting, by the parameter estimator layer of the neural network, the plurality of parameter values via a plurality of output nodes to a function layer of the neural network, wherein each output node is associated with one of the plurality of parameter values, wherein the function layer is configured to execute the image processing function;

generating, by the function layer of the neural network, an output image corresponding to the at least one source image, wherein the output image is generated by the function layer by executing the image processing function using the at least one source image and the plurality of parameter values;

receiving, by the parameter estimator layer, a ground truth image representing the at least one source image modified with a plurality of expected parameter values;

performing, by the parameter estimator layer, a loss optimization function using the ground truth image, the at least one source image, and the output image to identify adjustments to the plurality of parameter values; and weighting the plurality of output nodes of the parameter estimator layer using the adjustments to the plurality of parameter values.

14. The method of claim 13, wherein the image processing function is not differentiable.

15. A system, comprising:
one or more processors; and
a memory having stored thereon instructions that, when executed by the one or more processors, cause the one or more processors to:
train a neural network configured to perform image processing to generate a pre-trained model, wherein the neural network comprises a function layer that includes an image processing function, and wherein training comprises calculating a gradient approximation of the function layer;
receive, as input by the neural network, at least one source image, wherein the neural network is configured to process the at least one source image using the image processing function;
estimate, by a parameter estimator layer of the neural network and using the pre-trained model, a plurality of parameter values for processing the at least one source image;

provide the at least one source image and the plurality of parameter values to the function layer of the neural network, the function layer configured to execute the image processing function;

generate, by the function layer of the neural network, an output image corresponding to the at least one source image, wherein the output image is generated by the function layer by executing the image processing function using the at least one source image and the plurality of parameter values; and output, from the neural network, the output image.

16. The system of claim 15, wherein the image processing function is one of a function for which derivatives are unknown or a non-differentiable function.

17. The system of claim 15, wherein the instructions comprise further instructions that, when executed by the one or more processors, cause the one or more processors to:
output the output image via a user interface;
output the plurality of parameter values via the user interface; and
enable one or more of the plurality of parameter values to be modified via the user interface.

18. The system of claim 17, wherein the instructions comprise further instructions that, when executed by the one or more processors, cause the one or more processors to:
receive information indicating a change made to a first parameter value from the plurality of parameter values via the user interface;
modify the output image responsive to the change made to the first parameter value; and
display the modified output image via the user interface.

19. The system of claim 15, wherein the instructions comprise further instructions to train the neural network comprise instructions that, when executed by the one or more processors, cause the one or more processors to:
receive a ground truth image, wherein the ground truth image represents the at least one source image modified with a plurality of expected parameter values; and
train the parameter estimator layer based on the ground truth image, the at least one source image, and the output image.

20. The system of claim 15, wherein the plurality of parameter values are for a plurality of parameters, and wherein the plurality of parameters comprises at least one of shadow hue, midtone hue, highlight hue, shadow saturation, midtone saturation, highlight saturation, shadow gain, midtone gain, or highlight gain.

* * * * *